(12) United States Patent
Falk

(10) Patent No.: US 7,963,714 B2
(45) Date of Patent: Jun. 21, 2011

(54) SAFETY COUPLING ARRANGEMENT

(75) Inventor: Curt Gunnar Falk, Hudiksvall (SE)

(73) Assignee: Voith Turbo Safeset AB, Hudiksvall (SE)

( * ) Notice: Subject to any disclaimer, the term of this patent is extended or adjusted under 35 U.S.C. 154(b) by 839 days.

(21) Appl. No.: 10/583,667

(22) PCT Filed: Dec. 20, 2004

(86) PCT No.: PCT/SE2004/001935
§ 371 (c)(1),
(2), (4) Date: Jun. 21, 2006

(87) PCT Pub. No.: WO2005/061916
PCT Pub. Date: Jul. 7, 2005

(65) Prior Publication Data
US 2007/0068510 A1    Mar. 29, 2007

(30) Foreign Application Priority Data

Dec. 23, 2003 (SE) .......................... 0303519
Mar. 16, 2004 (SE) .......................... 0401045

(51) Int. Cl.
*F16L 13/00* (2006.01)
(52) U.S. Cl. .................... 403/5; 403/31; 403/15; 92/91
(58) Field of Classification Search ............ 99/327–333, 99/372–380, 339, 340, 348, 403–418, 444–450, 99/485–489, 516, 536; 126/20, 369, 391.1; 403/5, 31, 372, 227; 192/88 B, 70.13; 92/91, 35; 188/367
See application file for complete search history.

(56) References Cited

U.S. PATENT DOCUMENTS 4,077,690 A * 3/1978 Koether .................... 439/320
4,093,052 A * 6/1978 Falk ............................. 192/88 B

FOREIGN PATENT DOCUMENTS

SE    463327    5/1990

* cited by examiner

*Primary Examiner* — Henry Yuen
*Assistant Examiner* — Jianying Atkisson
(74) *Attorney, Agent, or Firm* — Dykema Gossett PLLC

(57) ABSTRACT

A safety coupling apparatus which includes first and second annular coupling parts for attachment to first and second coaxial rotatable shafts. The second coupling part defines an axial chamber which has an open end facing the first coupling part, and a radially-extending recess between a collar and a flange, both extending and located radially outwardly of the axial chamber, wherein the flange is spaced from the collar. An expandable hollow body of the first coupling part axially extends through the open end and into the axial chamber. A cavity subdivides the hollow body into inner and outer cylindrical sections and can (1) be filled with, or (2) emptied of pressurized fluid to expand or contract the inner and outer sections relative to one another and cause or prevent external surfaces thereof to contact adjacent surfaces of the axial chamber and thereby prevent or enable relative rotation of the first and second coupling parts.

23 Claims, 3 Drawing Sheets

SAFETY COUPLING ARRANGEMENT

BACKGROUND OF THE INVENTION

1. Field of the Invention

The present invention relates generally to a safety coupling arrangement, and particularly to a safety coupling arrangement that includes a first coupling part adaptable for a fixed co-action with a shaft, axle or corresponding element and which functions to transmit torque and rotational movement to the safety coupling, and a second coupling part adaptable for fixed co-action with a shaft, axle or corresponding element and which transmits torque and rotational movement from the safety coupling.

Safety couplings of this construction also include a safety unit which is adapted to take or be introduced into either one of two different setting positions, a first setting position in which torque and rotary movement can be transmitted between the two safety coupling parts, and a second setting position in which torque and rotary movement cannot be transmitted between the two safety coupling parts.

More particularly, the present invention is concerned with the use of a safety unit that can take the first setting position by virtue of an expansion of a hollow-cylindrical subpart or body, where the expansion is ensured by means of a pressure exerting agent or medium applied and enclosed in a cavity within the subpart of the safety unit, the pressure exerting agent or medium being illustrated hereinafter as an hydraulic pressure, such as an oil pressure, and that can take the second position by evacuating the pressure from the cavity.

A safety coupling according to the present invention is intended to find its application primarily in the transmissions by which there occurs sporadic torque stops, having, e.g., a duration of between 1 and 100 ms and expected to exceed a maximum torque for which such safety couplings are dimensioned.

Plants in which such conditions exist and utilise such rotatable transmissions are wind power, diesel motors and gas turbine motors driven by electric power generators, where frequent torque stops can occur in the event of short circuiting in the electric system or as a result of erroneous phasing (synchronisation) in respect of an electric power network.

More generally, a safety coupling according to the present invention, is adapted to enable it to transmit torque and rotary movement in an absence of slipping when the torque transmitted lies beneath a predetermined limit value, but causes activation of the safety unit immediately when this value is exceeded and a small relative movement occurs between the two safety coupling parts, the activated safety coupling quickly releasing the coupling action within the safety coupling such as to fully prevent any transmission of torque and rotational movement.

The present invention is based on a safety coupling as stated above wherein the material consumption in respect primarily of the second coupling part decreases successively in accordance with the chosen embodiment, without needing to relinquish the torque transfer requirement.

Described in the following is a safety coupling that includes a first externally-driven part, a second part that is driven by the safety coupling, and a safety unit which is normally integrated with the first coupling part. It should be noted, however, that the first coupling part and the second coupling part may switch places, without relinquishing the properties associated with the invention.

2. The Prior Art

Several different methods and arrangements of the aforesaid kind are known to the art.

The content of Swedish Patent Publication 78 06923-4, having a Publication No. 425 515, is a first example of known standpoint of techniques and the technical field to which the present invention relates.

This patent publication describes a safety coupling of the type which includes at least one thin-walled sleeve (12) that forms an axially directed defining wall in a generally ring-shaped chamber (15), wherewith the chamber is intended to receive a pressure fluid (17) with the intention of deforming the sleeve generally elastically in a radial direction, into clamping, locking engagement with a surface (21) of an element (11) intended for connection with the coupling (10), the shape and size of said surface corresponding generally to the surface (22) of said sleeve facing away from the chamber.

The publication makes particular reference to the fact that the chamber (15) includes an outlet (23) that is coordinated with an element (23, 30), which normally prevents the outflow of pressure fluid from the chamber but can be actuated to a state in which pressure fluid is allowed to leave the chamber and therewith actuate the coupling releasing state in response to a torsion or relative movement between each other and said surfaces (21, 22) on the coupling (10) and the element (11) respectively.

Another example of earlier standpoint of techniques is found in Swedish Patent Application 89 03077-9, having a Publication No. 463 327, said prior art document illustrating and describing a safety coupling for coupling together two co-axially rotatable parts (11, 12; 11', 12'), e.g., a shaft and a hub, comprising a generally cylindrical coupling element (15), which is intended to be brought in between the parts that are to be coupled together and which is expandable both radially outwards and radially inwards so as to exert coupling pressure on said parts (11, 12; 11', 12') via the coupling element (15) and a possible insert (30, 31), wherein the coupling element accommodates a pressure chamber (16, 16') which extends along said element and to which there is delivered a pressure fluid for achieving said expansion of the coupling element (15), and which includes means (25-27) for relieving said pressure in response to a relative rotation between said parts.

This prior art document describes a particular embodiment of the coupling element (15), in which said element exerts a greater coupling force on a first (11; 12') of said parts than on a second (12; 11') of said parts, wherein a pressure relieving means (25-27) is adapted to actuate a relative rotational movement between said first coupling part (11; 12') and said coupling element (15) and therewith allow a rotation between said second coupling part (12; 11') and said coupling element.

With regard to the special features of the present invention and the descriptions of these particular properties, it can be mentioned that FIG. 4 of said prior art Swedish patent publication 89 03077-9 shows and describes an arrangement that includes a plurality of components, where a subpart or a body, belonging to said safety unit, is inserted in a hollow-cylindrical groove whose width is adapted to correspond to a chosen small tolerated width or thickness of said subpart or body and where the groove is formed in a separate sleeve.

This embodiment illustrates that a coupling element (15) or a safety unit acts partly on a shaft (11) and partly on a hub (12) via an intermediate wall (30 and 31).

These form the illustrated legs of a single ring element (32) of "U"-shaped cross-section, wherein the ring element carries a shaft (11) via a bearing (19) together with the coupling (10).

The illustrated insert construction affords the advantage of avoiding the risk of damage to the coupling element (15) and the shaft (11) when releasing the coupling (10).

FIG. 4 also illustrates the use of a cylindrical gap (23) between said coupling element (15) and said hub (12).

In the case of safety couplings of this kind, it is usual to allow a coupling assembly to utilise three or more parts, of which one part is designed to surround a hollow-cylindrical subpart or body adapted for expansion and therewith serve as a force absorbing so-called holding-up means or counter-pressure means, for which it is dimensioned, wherein solely one cylindrical surface, the inner surface, of the hollow cylindrical body is adapted to create the desired torque transmission via pressure and friction.

SUMMARY OF THE INVENTION

When taking into consideration the technical deliberations that a person skilled in this particular art must make in order to provide a solution to one or more technical problems that he/she encounters, it will be seen that on the one hand it is necessary initially to realise the measures and/or the sequence of measures that must be undertaken to this end, and on the other hand to realise which means is/are required in solving one or more of said problems. On this basis, it will be evident that the technical problems listed below are highly relevant to the development of the present invention.

When considering the earlier standpoint of techniques, as described above, it will be seen that a technical problem resides in creation of conditions that will enable a safety coupling of the aforesaid kind to be given a much shorter longitudinal extension than has been possible with the aid of known technique, while nevertheless enabling a transfer of a corresponding torque during corresponding rotational movement.

Another technical problem resides in the ability to provide a construction whose fundamental conditions are such as to enable a much lighter safety coupling to be produced than has been found possible with the aid of the known technique, while still enabling the transmission of a corresponding torque during corresponding rotational movement.

In view of the fact that a general rule applying to manufacturing costs can normally be considered as being proportional to the total weight of such a safety coupling, a technical problem resides in the ability to take constructive measures that will result in a significant lowering of the total weight of the safety coupling, for instance a weight reduction of down to 50%.

A further technical problem resides in the ability to create a safety coupling in which, in relation to known techniques, a moment arm, allotted to a transferred torque, can be increased slightly in relation to said known technique.

Another technical problem resides in the ability to create a safety coupling of the aforesaid kind with a safety unit function of the aforesaid nature, where the safety coupling can be produced with the aid of only a few components or parts, such as solely two coordinated parts, here designated as a first coupling part and a second coupling part, wherein said first coupling part may conveniently be a driving part while said second coupling part may conveniently be a driven part.

In addition, it will be seen that a technical problem resides in allowing an expansion-adapted hollow-cylindrical subpart or body to be so constructed and configured that two cylindrical surfaces, an inner and an outer surface, are able to create, via one and the same pressure in an expanded state of a cavity and a subpart or body, a pressure and a frictional force against a hollow cylindrical groove of either one or the other of said parts and the two mutually opposing cylindrical surfaces of said groove such as to create desired torque transmission thereby.

Another technical problem also resides in the ability to realise the significance of and the advantages afforded by allowing said first or said second coupling part to include an axially directed or generally axially directed groove, and to allow said groove to surround a pressure-expandable subpart or said expandable body allotted to said safety unit and the whole or essentially the whole of said cavity.

A further technical problem resides in the ability to realise the significance of and the advantages afforded by adapting said expandable subpart or body so that, in its first expanded setting, torque is transferred directly to said first or said second coupling part via two opposing outer parts, such as cylindrical outer parts, of mutually different diameters and/or shapes, both being frictionally active against opposing outer parts, such as cylindrical outer parts, of the axial groove.

Another technical problem resides in the ability to realise the significance of and the advantages afforded by providing, to one or the other of said parts, a circular ring-shaped collar which is dimensioned to form a counter-pressure means and which shall be centred or essentially centred to said axially directed groove.

Another technical problem resides in the ability to realise the significance of and the advantages afforded by integrating said collar with said one or said other coupling part.

Still another technical problem resides in the ability to realise the significance of and the advantages afforded by providing an outer radially extending and radially orientated groove or recess between a connecting flange and a flange-associated collar between said one or said other coupling part.

Another technical problem resides in the ability to realise the significance of and the advantages afforded by creating a thin material section in said one or said other coupling part, between said outer radially directed groove and said safety-unit-adapted axially directed groove.

Another technical problem resides in the ability to realise the significance of and the advantages afforded by adapting and dimensioning said thin material section so that said section will be elastic and resilient with respect to the expanding forces that will act on said collar.

Another technical problem resides in the ability to realise the significance of and the advantages afforded by forming said safety unit as an integrated structure so as to enable said unit to form said first coupling part or said second coupling part and to include a flange or the like for fixed co-action with the torque transferring shaft fixedly connected to the safety coupling.

Another technical problem resides in the ability to realise the significance of and the advantages afforded by allowing an oil filling nipple to extend radially outwards from the safety unit, and to allow said filling nipple to be orientated in connection with said one or said other part and its allotted, as a counter-pressure means exposing, dolly-functioning collar.

Another technical problem resides in the ability to realise the significance of and the advantages afforded by allowing an element to be fixedly related to said collar and to co-act with, or to be able to co-act with, said filling nipple such that a small relative movement between said first and said second coupling part and/or said safety unit will shear off the filling nipple for a fast evacuation of the cavity pressure.

In this respect, there resides a technical problem in the ability to realise the significance of and the advantages afforded by providing a first ball bearing at the bottom of the axially directed hollow-cylindrical groove of the safety unit, for co-action between an expandable subpart or body of said safety unit and said groove.

Another technical problem resides in the ability to realise the significance of and the advantages afforded by providing a second ring-shaped ball bearing adjacent an opening of the axially directed hollow-cylindrical groove of said safety unit and for co-action between the expandable subpart or body of said safety unit and said groove.

Another technical problem is one of realising the significance of and the advantages associated with and/or the structural measures required in order to co-ordinate free end portions of the axially directed grooves, as seen in cross-section, forming material sections in the form of concentrical hollow-cylinder shapes, with a locking means there between in a chosen setting position thereof, where said locking means is adapted to prevent any divergence tendency of said free end portions when the safety unit takes its first and expanded setting together with a unit-associated subpart or body.

Another technical problem resides in the ability to realise the significance of and the advantages afforded by and/or the structural measures required for allowing said first coupling part and said second coupling part to be mutually adapted so that slightly overlapping and mutually coordinated cylindrical subsections will be obtained on a respective side of said axially directed groove in the second part of the safety coupling.

Another technical problem resides in the ability to realise the significance of, associated advantages and/or the structural measures required to allow the first coupling part to include an axially directed and positioned edge in the form of a hollow cylinder, said edge being intended for a tight co-action with a peripherally orientated and cylindrical groove formed in the second coupling part such as to form said mutually coordinated cylindrical subsections.

Another technical problem resides in the ability to realise the significance of and the associated advantages with and/or the structural measures required to allow said edge to be adapted and dimensioned for taking-up outwardly and radially directed forces, and which can be related peripherally to said first coupling part, and to allow said grooves to be formed peripherally in said second coupling part, and that said cylindrical edge shall have a given thickness and that said cylindrical groove shall be given a depth and/or axial length that is adapted, either directly or indirectly, to the given thickness.

Another technical problem resides in the ability to realise the significance of, and the advantages associated with and/or the structural measures required in allowing said cylindrical subsection and the opposing frictional surfaces related thereto to be adapted for significant torque transfer via axially orientated and cylindrical outer sections.

A further technical problem resides in the ability to realise the significance, associated advantages with and/or the structural measures required in allowing the use of an active axial length in respect of said outer sections or cylindrical friction surface, and a normal pressure dependent on chosen expansion of the expandable subpart of the safety unit, mutually adapted with a frictional coefficient that is able to provide a torque transmission of between 10 and 30% of the total transferable torque between said first and said second coupling parts and at least allow the torque transfer to be adapted to between 15 and 25%.

Another technical problem resides in the ability to realise the significance of, the advantages associated with and/or the structural measures required in allowing said axially directed groove in the second coupling part to be given a length of more than 50% of said expandable subpart of the safety unit.

Another technical problem resides in the ability to realise the significance of and the advantages associated with and/or the structural measures required in allowing said length to be less than 80% of the axial length of said expandable subpart.

A further technical problem resides in the ability to realise the significance of and the advantages associated with and/or the structural measures required in allowing two concentric, overlapping and hollow-cylindrical subsections of the first and the second coupling parts to have mutually similar, or essentially similar, radial thicknesses.

Another technical problem resides in the ability to realise the significance of and the advantages associated with and/or the structural measures required in allowing the outer subsection with regard to said two overlapping hollow-cylindrical subsections, to have a greater or smaller radial thickness and/or a longer or shorter axially extension than the inner part of said section.

Another technical problem resides in the ability to realise the significance of and the advantages afforded by allowing the subpart of said first coupling part to be formed so as to function as a locking means against any expansion of the free end parts, or the legs, of the material section that forms the axially orientated groove, when seen in cross-section, in the second coupling part.

Another technical problem resides in the ability to realise the significance of, the advantages afforded by and/or the structural measures required in allowing said radial material thickness of the material sections or legs, that form the axially orientated groove, to be the same or essentially the same.

A technical problem also resides in the ability to realise the significance of and the advantages afforded by and/or the structural measures required in allowing a radius difference between opposing cylindrical and concentrical outer parts of the axially orientated groove to be mutually the same, or at least essentially the same, as the total radial thickness of said material sections or legs, such as their end portions.

The present invention takes as its starting point the aforedescribed known technology with regard to a safety coupling arrangement, and then more specifically to such a safety coupling that includes a first coupling part adapted for fixed co-action with a shaft, axle or the like by means of which torque and rotational movement is transferred to the safety coupling, and a second coupling part adapted for fixed co-action with a shaft, axle or the like for a transfer of torque and rotational movement from said safety coupling, and further including a safety unit.

More particularly, the present invention relates to a safety coupling arrangement in which the safety unit and an expandable and hollow-cylindrical subpart or body belonging to said safety unit are adapted to be able to take one of two setting positions, a first setting position, in which torque and rotational movement can be transferred between said two parts, and a second setting position, in which torque and rotational movement cannot be transferred between said two parts.

The safety unit is caused to take its first setting position as a result of an expansion caused by applying and enclosing a pressure in a cavity within the subpart or body of the safety unit, and is caused to take its second setting position as a result of evacuating the pressure within the cavity, e.g., by rapid evacuation.

With the intention of solving one or more of the aforesaid technical problems, it is proposed, in accordance with the invention, that the known technology in particular shall be supplemented by providing said first or said second coupling part with an axially directed or essentially axially directed, groove, and by adapting said groove so that it will embrace a pressure-expandable subpart or a body expanded thereby, included in said safety unit and the whole or essentially the whole of the axially extension of said cavity, and by adapting the expandable subpart or body so that in its first setting position occurring torque can be transferred directly to said first or said second coupling part via two mutually opposite outer parts, such as cylindrical outer parts, frictionally active against opposing outer parts of the groove, such as cylindrical outer parts.

By way of further embodiments, that lie within the scope of the inventive concept, it is proposed that said one or said other of the coupling parts will include a hollow-ring collar, which is dimensioned as a so-called counter-pressure means and which is centred or essentially centred with said axially directed groove.

It is also proposed that the collar forms an integral part with said one or said other coupling part.

It is also proposed, in accordance with the invention, that there is provided an outer radially directed groove or recess between a flange on said one or said other coupling part and said collar.

It is particularly proposed that a thin material section is provided and formed between said outer radial groove or recess between said one or said other coupling part and said axially directed groove of the safety unit, said thin material section being adapted and dimensioned to present elastic and resilient properties in response to forces from an expanded collar.

It is particularly proposed, in accordance with the invention, that the safety unit shall be integrated with and form said first coupling part or said second coupling part, and include a flange or the like for fixed co-action with a torque transferring shaft connected to the safety coupling.

It is also proposed, in accordance with the invention, that a pressure medium filling nipple, such as an oil-filling nipple, shall be adapted to extend radially out from the safety unit and be positioned in connection with said one or said other coupling part and its ring-shaped hollow collar.

Fixedly related to the collar is a device which is intended to co-act with said nipple such that only a small or minor relative movement between said first or said second coupling part and said safety unit will cause said nipple to shear for a rapid evacuation of the enclosed pressure.

It is also proposed, in accordance with the invention, that a first ring-shaped ball bearing shall be placed at the bottom of the safety unit groove for co-action between the subpart or body of the safety unit and said groove, and that a second ring-shaped ball bearing shall be placed adjacent an opening of said safety unit groove for co-action between the safety unit and the groove.

It is also proposed in accordance with the invention that the free end portions of the material sections forming the axially directed groove shall be coordinated end part locking means adapted for preventing divergence of said free end portions when the safety unit and its associated expandable subpart or body takes a first and expanded setting.

It is also proposed that said first coupling part and said second coupling part shall be adapted so as to obtain mutually overlapping and mutually co-ordinated cylindrical subsections on a respective side of the axially directed groove when seen in cross section.

It is also proposed that the first coupling part shall include a hollow-cylindrical axially directed edge, projection or corresponding element adapted for co-action with a cylindrical peripheral groove formed in said second coupling part.

It is also proposed that said edge shall be related peripherally to said first coupling part and that said groove shall be formed peripherally in said second coupling part.

The cylindrical subsections shall be adapted for clamping fixed co-ordination with a torque transfer via axially orientated and cylindrical friction surfaces and/or outer sections.

It is also proposed, in accordance with the invention, that a chosen length of said cylindrical friction surfaces and/or outer sections and a normal pressure dependent on the chosen expansion of the subpart assigned to the expandable safety unit shall mutually be adapted for torque transfer of between 10 and 30% of the totally transferred torque between said two parts.

More particularly, the chosen torque transfer may be adapted to between 15 and 25%.

It is also proposed, in accordance with the invention, that the axially directed groove in the second coupling part shall have a length greater than 50% of said expandable subpart in the safety unit, and that said length is preferably less than 80% of the axial length of said expandable subpart.

The overlapping cylindrical subsections shall conveniently have the same radial thicknesses or generally the same radial thicknesses. Alternatively, the radial thickness of the overlapping subsections of the outer subsection may be greater or smaller than the radial thickness of the inner subsection.

More particularly, it is proposed that the first coupling part is designed to function as a locking means against the expansion of the free end parts of the free end portions of the material sections for the legs, viewed in cross-section, that form the groove in the second coupling part.

The material sections or legs that define the groove shall conveniently have mutually the same thickness or essentially the same thickness.

More particularly, it is also proposed that the radius difference between mutually opposed cylindrical outer parts of the groove shall be the same, or essentially the same as the total radial thickness of said two free end portions or legs.

Those advantages that can be considered primarily characteristic of the present invention and its particular significant features reside in the creation of conditions with which a safety coupling can be made much shorter than a typical safety coupling while retaining an adapted torque and selected rotary movement, and with which the weight of the coupling can be made much lighter than earlier known safety couplings, particularly by virtue of the safety coupling being comprised of only a few parts, wherewith an expandable subpart or body of the safety unit, when in its expanded state, is able to transfer torque to said first or said second coupling part via two opposing outer parts, such as cylindrical parts, that act frictionally against opposing outer parts, such as cylindrical outer parts, of a radial groove.

The invention also includes different measures that will enable the creation of a safety coupling for torque transfer between a rotatably arranged first coupling part and a rotatably arranged second coupling part, and wherein measures have been taken to reduce the amount of material required in general, corresponding to dimensioning of the maximum transferable torque and then primarily for the second or the further coupling part.

BRIEF DESCRIPTION OF THE DRAWINGS

Significant features of the present invention will now be described by way of example with reference to known technology and two a number of embodiments of the invention at present preferred, and also with reference to the accompanying drawings, in which;

FIG. 6 is a sectioned side view of an earlier known safety coupling arrangement of the kind in question, said arrangement being shown in a simplified form; and is intended to be used in a plant according to FIG. 1;

FIG. 7 is a sectioned side view of a modified embodiment of an arrangement shown in FIGS. 4 and 5, whereas FIG. 8 is a sectioned view of a further embodiment of a safety coupling arrangement in which requisite material consumption has been reduced still further in relation to the requirement in FIG. 7;

FIG. 9 is a sectioned side view of a somewhat enlarged arrangement, according to FIG. 8, with the two coupling parts and associated safety unit in a slightly laterally displaced position, so as to illustrate the invention and its significant features more clearly, whereas

DETAILED DESCRIPTION OF THE PREFERRED EMBODIMENT

Figure 1:
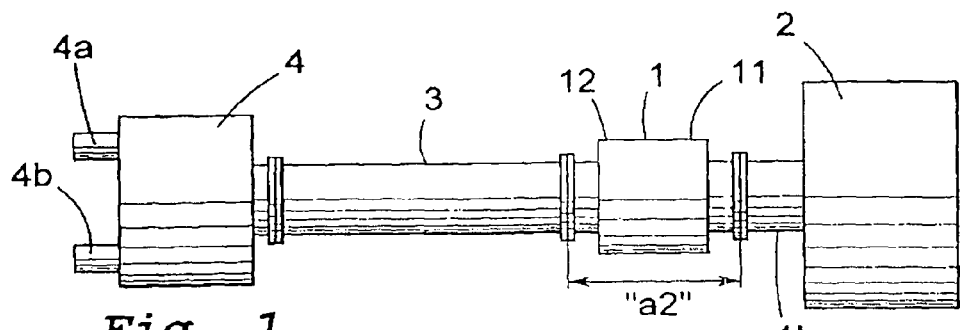
FIG. 1 is a principle illustration of a known plant that includes a motor and a gearbox, with an earlier known safety coupling.
Figure 3:
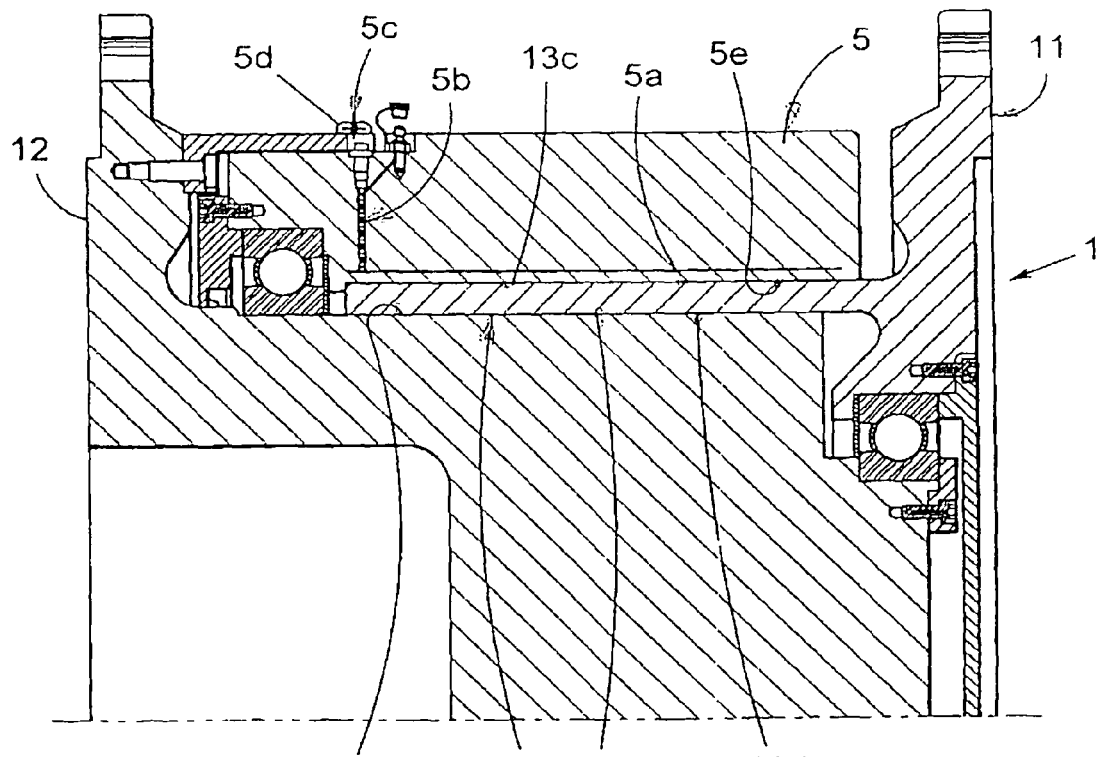
FIG. 3 is a side view and a sectional view of a safety coupling that includes a safety unit used in the plant according to FIG. 1.
Figures 6, 7, 8:
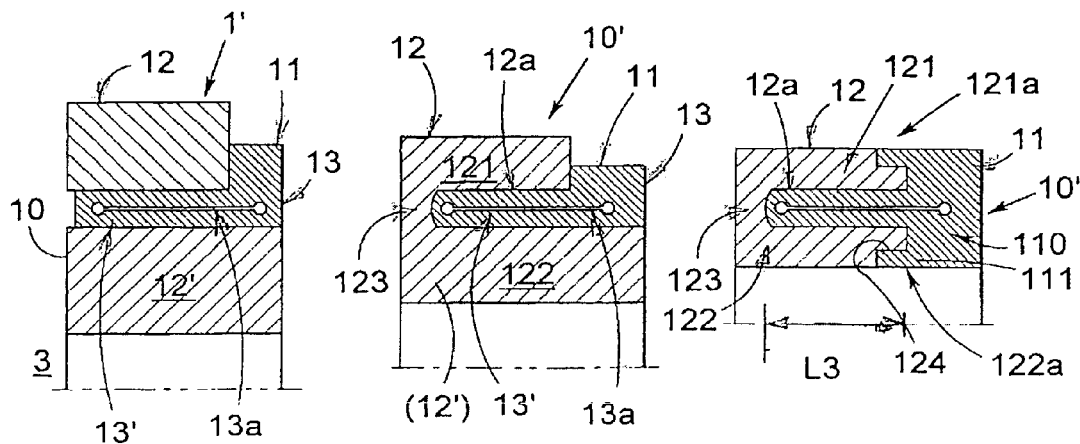

Thus, FIGS. 1 and 3 and FIG. 6 are intended to illustrate and show the technology known at present with reference to a plate in FIG. 1, by means of which torque can be transmitted from a motor or engine 2, via a shaft 3, to a gearbox 4 that includes two synchronously driven axles 4a, 4b, with the aid of a safety coupling 1, illustrated in FIG. 3 and FIG. 6.

The safety coupling 1 according to FIG. 1 is illustrated more specifically in FIGS. 3 and 6 and described more clearly with reference to these figures, where a first coupling part 11 of the coupling is adapted for fixed coaction with a shaft 1' or corresponding means for the transmission of torque and rotational movement to the safety coupling 1, and a second coupling part 12 adapted for fixed coaction with a shaft 3 or corresponding means for transferring torque and rotational movement from the safety coupling, the hollow shaft 3 coacting with the gearbox 4 via a bolt connection in a known manner.

FIG. 3 as well as FIG. 6 shows a safety unit 13 which is integrated with said first coupling part 11 and which is adapted to be able to take one of two setting positions a first expanded setting position, in which torque can be transferred between the two parts 11, 12 during a selected rotational movement, and a second setting in which no torque and associated rotational movement can be transferred between the two parts, since in that second setting the parts are not in torque transfer coaction with each other.

The inner cylindrical surface 13d of a hollow-cylindrical part 13' rests against the outer cylindrical surface 12c of said second coupling part 12, whereas the outer cylindrical surface 13c rests against a cylindrical inner surface of a hollow cylindrical counter-pressure device or holding-up device or means 5, whose part 5e facing the surface 13c has an axially directed cylindrical cavity 5a positioned adjacent said part 5e, wherein pressurised medium (say 100 bar) can be delivered to said cavity 5a via a channel 5b and a nipple 5c, so that the counter-pressure device or element 5 will be able to press said part 13' into frictional co-action with the surface 12c of said second coupling part 12 for a torque transfer.

There is required to this end a very strongly dimensioned hollow-cylindrical part 5, and the torque transfer illustrated in this case takes place solely via the mutually opposing cylindrical surfaces 13d and 12c.

An element 5d is fixed in relation to the second coupling part 12 and co-acts with or is capable of co-action with a filling nipple 5c such that small relative movement between said first coupling part 11 and said second coupling part 12 will cause the filling nipple 5c to shear, for a rapid evacuation of said enclosed pressure, therewith enabling said first coupling part 11 to rotate freely in relation to said second coupling part 12, which is otherwise driven by the coupling, in the absence of torque transfer.

It is pointed out initially that we have chosen to use in the following description of an embodiment that is at present preferred and that includes significant characteristic features of the invention and illustrated in the FIGS. 2, 4, 5, 7-10 of the accompanying drawings special terms and special terminology with the primary intention of illustrating the inventive concept more clearly.

However, it will be noted that the expressions chosen here shall not be seen as limited solely to the chosen terms used in the description, but that each chosen term shall be interpreted as also including all technical equivalents that function in the same or at least essentially in the same way so as to achieve the same or essentially the same purpose and/or technical effect.

Figure 2:
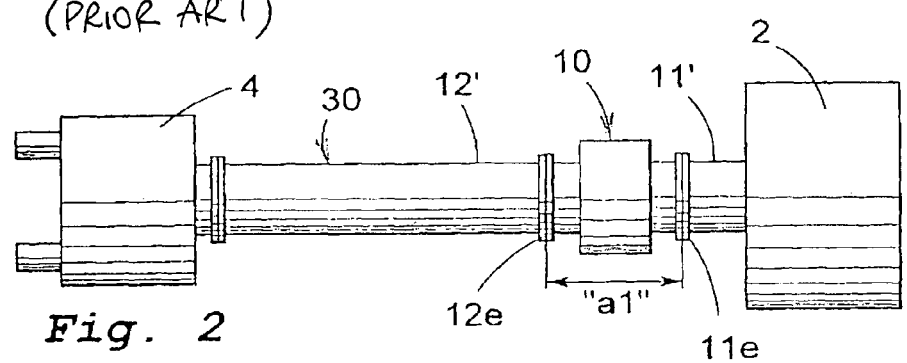
FIG. 2 is an illustration, similar to the FIG. 1 illustration but with a safety coupling constructed in accordance with the invention, where safety couplings according to FIG. 1 and FIG. 2 are dimensioned for the transfer of the same torque and with the same rotary movement or rpm.
Figure 4:
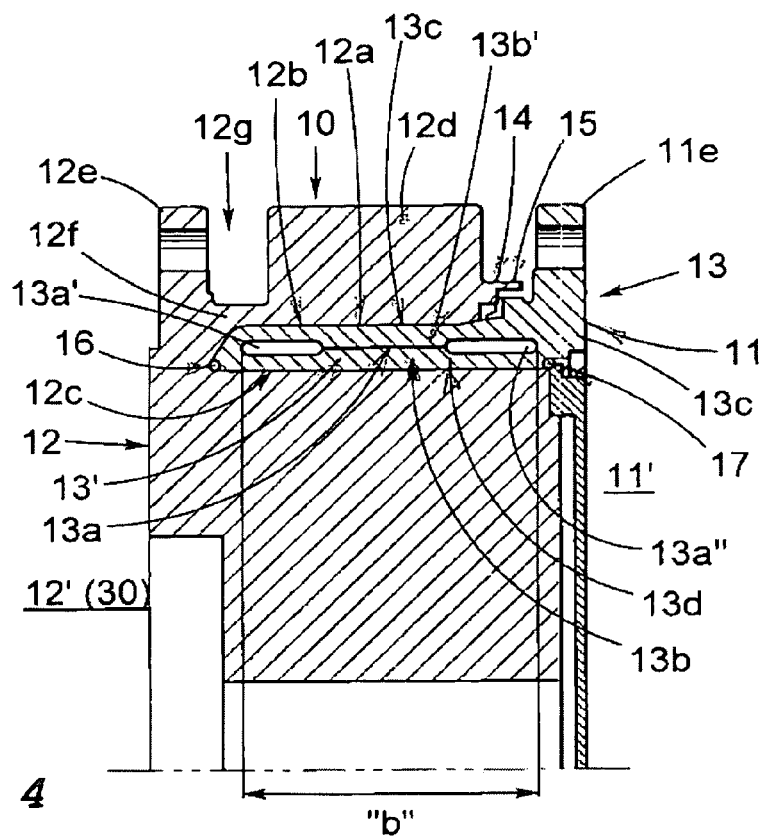
FIG. 4 illustrates in a side view and a sectional view of a first embodiment of a safety coupling that includes a safety unit in accordance with the present invention, utilized in a plant according to FIG. 2.

FIG. 2 is a diagrammatic illustration of the basic conditions of the present invention, in which significant properties of the invention have been concretised by virtue of embodiments of an employed safety coupling, identified by reference numeral 10 in FIGS. 2 and 4, but by reference sign 10' in FIG. 5 and FIGS. 7-10.

As will be seen from FIG. 2, the safety coupling 10, as well as safety couplings 10' provided by the present invention, has a much smaller longitudinal extension "a1" than the length "a2" of the safety coupling 1 shown in FIG. 1, and consequently the FIG. 2 embodiment requires a longer shaft section 30 than the shaft section 3 shown in FIG. 1, provided that the motor or engine 2 and the gearbox 4 are fixedly connected and spaced equidistantly apart.

Naturally, it lies within the scope of the invention to move the motor 2 and/or the gearbox 4 closer together in the event of such a situation being possible.

A first embodiment 10 of a safety coupling according to the present invention will now be described in more detail with reference to FIG. 4; however, this description is also valid, at least in parts, to the safety coupling arrangement 10' illustrated in FIG. 5 and FIGS. 7 to 10.

Similar to FIG. 3, FIG. 4 is a sectional view of a safety coupling 10 that includes a first coupling part 11, which is adapted for fixed co-action with a shaft, axle or the like 11' for transferring torque and rotational movement to said safety coupling 10, and a second coupling part 12, which is adapted for fixed co-action with a shaft, axle or the like 12' (or 30 in FIG. 2) for transferring torque and rotational movement from the safety coupling 10.

There is, of course, nothing to prevent said first coupling and driving part 11 of the coupling 10 to constitute the second coupling and driven part 12 of said coupling parts and for the second driven part 12 to constitute the first driving part 11, with the direction of torque transfer thus being reversed.

In the case of the FIG. 4 embodiment, the shaft 11' is a driving shaft, via the motor 2, whereas the shaft 12' (30) is the shaft that is rotated from the safety coupling 10.

The embodiment also includes a safety unit 13, which is integrated with said first coupling part 11 and which is able to take one of two different settings, a first expanded setting in which torque and associated rotary movement can be transferred between said two coupling parts 11, 12, and a second setting (not shown) in which torque and rotational movement cannot be transferred between said two coupling parts.

The safety unit 13 takes its first setting as the result of an expansion of a hollow-cylindrical part 13' that forms a subpart of the unit 13 or a body 13', this expansion being caused by a pressure, such as an oil pressure, delivered to and enclosed in a cavity 13a in the safety unit 13 or the body 13', and takes its second setting as a result of a total evacuation of the oil pressure from said cavity 13a, preferably a very fast evacuation.

In the case of the FIG. 4 embodiment, the other coupling part 12 includes an axially directed, or generally axially directed, groove 12a, which is adapted and dimensioned to enable it to surround the oil-pressure expandable subpart or body 13', which comprises two cylindrical sections 13b and 13b' of said safety unit 13 and the whole, or essentially the whole, of the axial extension "b" of said cavity 13a.

When in its first setting, the expandable subpart 13' functions to allow torque to be transferred directly to said second coupling part 12 via two mutually opposing cylindrical surface parts 13c, 13d, which are frictionally active against opposing cylindrical surface parts 12b, 12c of the groove 12a.

It will be evident from FIG. 4 that the groove 12a has a concentrical hollow-cylindrical form and that the expandable subpart 13' also has a concentrical hollow-cylindrical form, although it will be noted that the dimension of the hollow-cylindrical form of the expandable subpart 13' is such as to enable it to be passed into the hollow-cylindrical groove 12a, when the expandable subpart 13' is not in an expanded state.

However, it will be obvious that the groove 12a can be given a conical shape and that the sections 13b, 13b' of the subpart 13' may be given a corresponding conical shape. Alternatively, corresponding parts and surfaces may be given a stepped configuration.

FIG. 4 illustrates further that the second coupling part 12 includes a collar 12d which is dimensioned as and functions as a counter-pressure element or means and which is centred, or essentially centred, in respect of said axially directed groove 12a.

The collar 12d shall be conveniently formed integral with said second coupling part 12.

In the embodiment illustrated in FIG. 4, an outer radially directed groove or recess 12g is provided between a flange 12e on the second coupling part 12 and said collar 12d.

This results in the formation of a thin section of material 12f, within the second coupling part 12, between said radially directed groove 12g and said axially directed groove 12a belonging to the safety unit.

This thin material section 12f shall be adapted to enable it to spring elastically when the collar 12d is subjected to outwardly and radially directed forces from an expanded subpart 13'.

As illustrated further in FIG. 4, the safety unit 13 is integrated with and constitutes said first coupling part 11, which includes a flange 11e for a fixed co-action with the torque transfer shaft 11', connected to the safety coupling 10.

FIG. 4 also illustrates the use of an oil-filling nozzle 14, which extends radially outwards from the safety unit 13 and which is positioned in connection with said second coupling part 12 and its collar 12d.

Also provided is a device 15 which is fixed in relation to said collar 12d and which co-acts with or is capable of co-acting with said filling nipple 14 such that a small relative movement between said first coupling part 11 and said second coupling part 12 or said safety unit 13 will cause the filling nipple 14 to shear, for a rapid evacuation of said oil pressure and therewith release of the torque transfer through said safety coupling 10.

A first ball bearing ring 16 is placed at the bottom of the safety unit related groove 12a and co-acts between the safety unit and the groove while supported by said second coupling part 12.

A second ball bearing ring 17 is arranged adjacent an opening of the safety unit groove 12a and co-acts between the safety unit and the groove while supported by said second coupling part 12.

Figure 5:
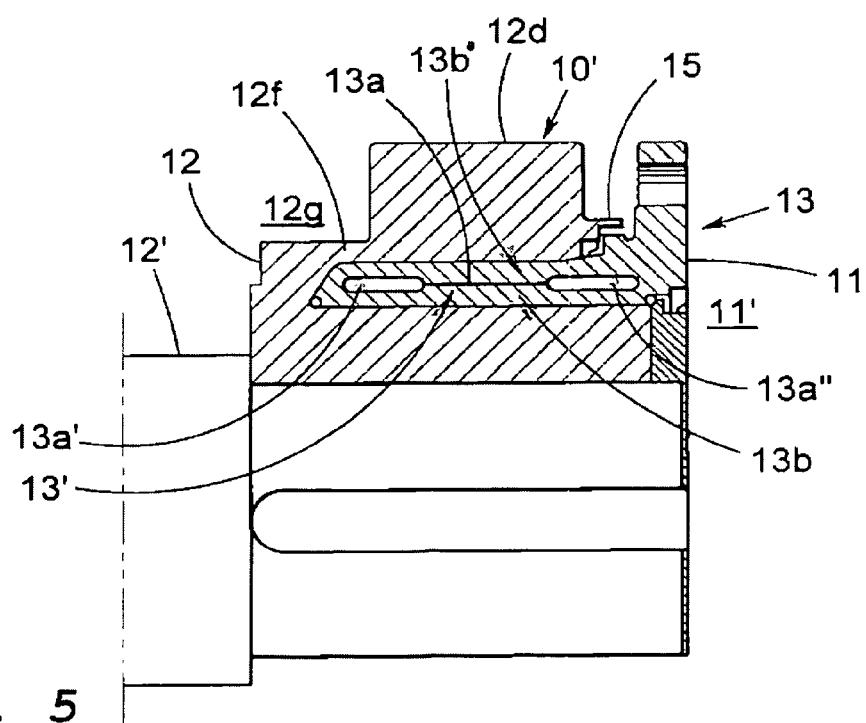
FIG. 5 illustrates a second embodiment of a safety coupling that includes a safety unit according to the present invention.

FIG. 5 illustrates another embodiment 10' of the present invention, this further embodiment being based on a fixed connection of a second coupling part 12 to a shaft 12' via a wedge-shaped groove or keygroove, therewith allowing the flange 12e to be excluded.

The FIG. 5 embodiment is comparable with the FIG. 4 embodiment in other respects.

As shown in FIG. 4, the cavity 13a is formed by two opposing cylindrical surfaces of said cylindrical sections 13b, 13b', wherein the end regions form open rings or cavities 13a', 13a'', therewith ensuring parallel, or at least essentially parallel, displacement of the sections 13b and 13b' included in the expandable subpart or body 13'.

This creates conditions for an adapted distribution of the clamping forces between the outer parts 13c, 13d and the outer parts 12b, 12c.

The outer parts 13c and 13d may be treated to present prepared frictional surfaces, such as nitriting said surfaces, so as to have a static friction coefficient of about 0.14.

A known safety coupling 1, according to FIG. 1, dimensioned for a torque of 11,000 kNm will have a weight of 15,700 kg, whereas a safety coupling 10, according to FIG. 2, dimensioned for a corresponding torque of 11,000 kNm will weigh only 7,900 kg.

It will be noted, however, that the safety coupling 10 or 10' includes a construction for the safety part or subpart 13' of the safety unit 13 that enables it to transfer an adapted torque in connection with the open part of the groove 12a and to allow the torque to be distributed along opposing frictional surfaces to said second coupling part 12.

FIG. 6 illustrates a further alternative of a known safety coupling arrangement, which includes a first hollow-cylindrical part 11 and two second hollow-cylindrical parts 12, 12'. The outer hollow-cylindrical part 12 forms an outer support ring for the first part 11 which is supported, in turn, by a further part 12' that functions as an inner holding-up or counter-pressure element or device for the first part 11.

This embodiment is intended to illustrate that with a first hollow-cylindrical part 11 and an integrated safety unit 13 placed between two force-absorbing second hollow-cylindrical parts 12, 12' robust dimensioning of the hollow-cylindrical second parts 12, 12' is required in order to be able to take-up those forces generated by an overpressure of 1000 bar within the cavity 13a of the hollow-cylindrical part 13' in the case of a given maximised torque.

As will be seen from FIG. 7, similar to the illustrations in FIGS. 4 and 5, said first coupling part 11 with integrated safety unit 13 is inserted in a recess or an axially directed groove 12a in the second coupling unit 12, consisting in this case in an edge-orientated integration of said two parts 12, (12').

More particularly, the second coupling part 12 has a "U"-shaped cross-section with the legs 121 and 122 co-ordinated, via an intermediate part 123, to form said hollow-cylindrical, axially orientated groove 12a.

In this case, the maximised torque requires a hydraulic pressure of 500 bar to be delivered to the part 13' of the cavity 13a, although this will result in progressive divergence of the legs 121 and 122, the degree of divergence depending on the hydraulic pressure applied and a bending moment active within the intermediate part 123.

FIG. 8 illustrates a further embodiment of an arrangement, according to the present invention, with which the material reduction with respect to the part 12 is in excess of the material reduction in respect of the FIG. 7 embodiment.

The FIG. 8 arrangement also includes a first coupling part 11 and a second coupling part 12, both of which are hollow-cylindrical and concentrically orientated, where the second coupling part 12 has a first material section in the form of a first hollow-cylindrical leg 121, a second material section in the form of a second hollow-cylindrical leg 122, and a third material section 123 or material part, where mutually opposing cylindrical outer parts 12b, 12c of the legs define the axially-directed groove 12a as viewed in cross-section.

The legs 121 and 122 also in this case form together with an interconnecting section or intermediate part 123 a "U"-form in cross-section, but with legs in FIG. 8 embodiment of weaker dimensions than in the other illustrated embodiments, such as in FIG. 6 and FIG. 7 embodiments.

Figure 9:
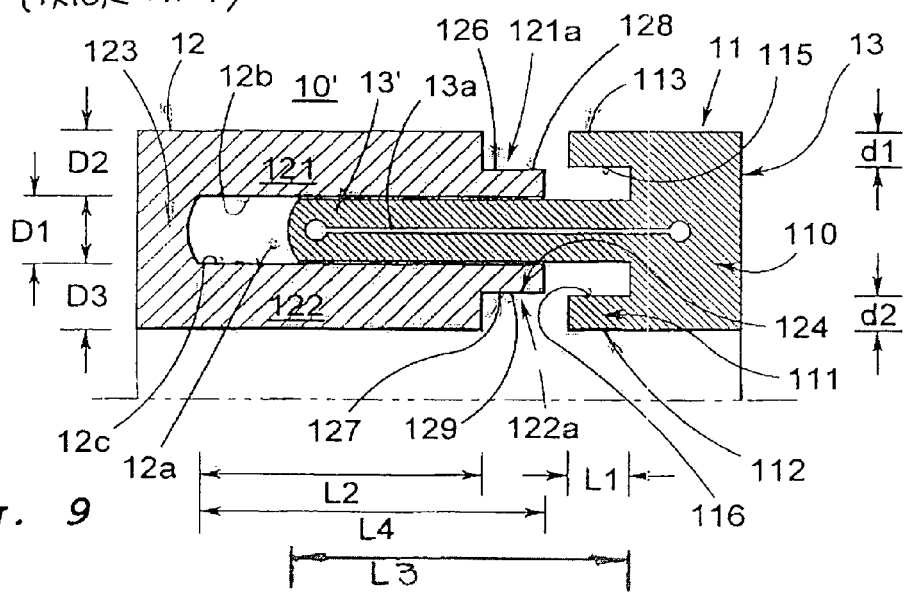
Figure 10:
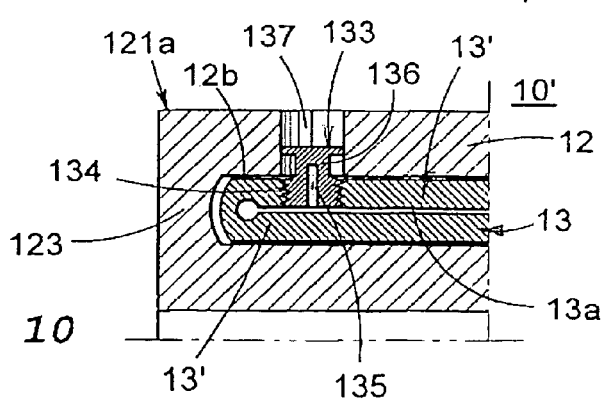
FIG. 10 illustrates an end-related part-section, where a safety unit, having an end-related expandable subpart constitutes a first coupling part, and where the first coupling part is shown in co-action with a second coupling part, used in the embodiments according to FIGS. 8 and 9 via a shear pin arrangement

In the case of the embodiments illustrated in FIGS. 8, 9 and 10, the free end portions or cylindrical subsections 121a, 122a of the material sections or legs 121, 122 forming the axially-directed groove 12a are coordinated with an intermediate locking means 110 for mutually connecting the free end portions of said legs 121, 122 in a manner corresponding to the intermediate force-take-up element or device 123.

As shown in the embodiment according to FIGS. 8, 9 and 10, the first coupling part 11, its requisite safety unit 13, its associated expandable subpart 13' and its cavity 13a together with the locking means 110 shall be coordinated with each other.

The locking means 110 proposed, in accordance with the directives of the invention, shall be particularly intended and designed for preventing divergence of the free end portions 121a, 122 when the safety unit 13 and its associated subpart or body 13' take their first and expanding setting.

In this positional setting of the safety unit, the leg 121 will bend upwards and the leg 122 will bend downwards in connection with the part or intermediate device 123 such as to form a respective arcuate shape.

This arcuate shape has a tendency to bend outwards or upwards at the end portion 121a of the leg 121 and inwards or downwards at the end portion 122a of the leg 122; however, this tendency is compensated for due to the coaction of the locking means 110 with the end portions 121a and 122a.

Seen in cross-section, this can be considered as a bending incident corresponding to a bending incident for a beam, anchored and clamped firmly in both of said ends.

For the purpose of forming the locking means 110, the first coupling part 11 and the second coupling part 12 include on respective sides of the axially-directed groove 12a mutually overlapping and coordinated cylindrical subsections, where the first coupling part 11 has a subsection 111, and the second coupling part 12 has a subsections 124.

More particularly, as shown in FIG. 9, the first coupling part 11 shall include at the subsection 111 two axially directed edges or projections 112, 113, each having a hollow-cylindrical shape with coincidental centre axes but with different diameters. The edges 112, 113, however, are integrated with the first coupling part 11 and are dimensioned such as to function as a locking counter-pressure element or means.

The edges 112 and 113 are adapted for tight co-action with a respective peripheral groove 126, 127 formed in said second coupling part 12.

More specifically, the edges 112, 113 are related peripherally to said first coupling part 11 and said grooves 126, 127 are formed peripherally in said second coupling part 12.

The subsections 111 and 124 with associated edges 112, 113 and associated grooves 126, 127 are adapted for torque transfer upon activation (expansion) of the expandable subpart 13' of the safety unit 13 via axially orientated and cylindrical friction surfaces or outer sections, referenced 115, 116, with regard to the first coupling part 11, and 128, 129 with regard to the second coupling part 12.

These outer sections 115, 116 and 128, 129 respectively may conveniently be treated to enhance the frictional effect particularly to enhance torque transfer.

The length "L1" of said outer sections 115, 116; (128, 129) and a normal pressure that depends on a chosen expansion of the expandable subpart 13' are mutually adapted for a torque transfer of between 10 and 30% of the total torque transferred between the first and the second coupling parts 11, 12.

Practical calculations indicate that the chosen torque transfer shall, in this case, be adapted to between 15 and 25%.

It is thus feasible, within the scope of the present invention, to choose a longer or a shorter length "L1", with a corresponding reduction or extension of the active length "L2" between the surfaces 12b and 12c and the active length "L3" of the subpart 13'.

In this case, an hydraulic pressure of about 400 bar is required to achieve the aforesaid maximised torque.

More specifically, the axially directed groove 12a may have a length "L4" which is more than 50% of the length "L3" with regard to the expandable subpart 13', and less than 80% of said axial length "L3" of said expandable subpart 13'.

It is also proposed that the overlapping subsection, with its edges 112, 113 (and groove) shall have equal, or generally equal radial thickness "d1" and "d2", and that of said two overlapping subsections the outer section 113 may be given a greater thickness "d1" than the inner section 112, or vice versa.

FIG. 9 thus illustrates an embodiment in which the first coupling part 11 shall be formed to provide locking against expansion of the free end portions 121a, 122a of the legs that form the groove 12a in the second coupling part 12.

The material sections or the legs 121, 122 that form the groove 12a have the same or essentially the same thickness. However, there is nothing to prevent the inner leg 122 from being slightly thicker so as to obtain a similar force distribution from the subpart 13'.

More particularly, it is proposed that a chosen radius difference "D1" between mutually opposing cylindrical outer parts 12b, 12c of the groove 12a may be the same or essentially the same, although preferably greater than the total radial thickness "D2" and "D3" of said free end portions or legs 121, 122.

FIG. 10 shows the insertion of a shear pin between the subsection 13' of the safety unit 13 and the second coupling part 12.

The pin 133 is screwed with a sealing device into a threaded part 134 of the subpart 13' and includes a channel 135 which is meant to extend past the surface 12b and therewith create conditions in which relative movement between the coupling part 12 and the subpart 13 (or the coupling part 11) will cause the pin 133 to shear and therewith release the pressure in the cavity 13a. The sheared part 136 is therewith displaced from a hole 137, formed in the leg 121.

It will be understood that the invention is not restricted to the embodiments described by way of example above, since modifications can be made within the scope of the inventive concept as illustrated in the accompanying Claims.

It will also be noted in particular that each illustrated unit can be combined with each other illustrated unit such as to enable a desired technical function to be achieved.

The invention claimed is:

1. A safety coupling apparatus which comprises:
    a first annular coupling part for torque attachment to an end of a first rotatable shaft,
    a second annular coupling part for attachment to an end of a second rotatable shaft which is coaxial with the first rotatable shaft,
    said second coupling part defining an axial groove which has an open end facing the first coupling part, a radially outwardly-extending collar located radially outwardly of the axial groove, and a radially outwardly-extending flange which is spaced from the collar to define a radially inwardly-extending recess therebetween, and
    said first coupling part defining an expandable hollow body which axially extends through said open end and into said axial groove of said second coupling part, said hollow body including a cavity which subdivides said hollow body into inner and outer cylindrical sections and which can be (1) filled with pressurized fluid to expand the inner and outer cylindrical sections relative to one another and cause external surfaces thereof to contact adjacent surfaces of said axial groove and thereby prevent relative rotation of the first and second coupling parts, or (2) emptied of pressurized fluid to contract the inner and outer cylindrical sections relative to one another and enable free rotation of the first and second coupling parts relative to the one another.

2. The apparatus according to claim 1, wherein a thin material section is formed in said second coupling part between said radially-extending recess and said axial groove.

3. The apparatus according to claim 2, wherein said thin material section is elastically resilient.

4. The apparatus according to claim 1, including a pressure medium filling nipple which extends radially out from the safety unit and is positioned in connection with said first and second coupling parts and its collar.

5. The apparatus according to claim 4, including a device which is fixed in relation to said collar coacts with said filling nipple such that a small relative movement between said first coupling part and said second coupling part will cause the filling nipple to shear for a rapid evacuation of said pressurized fluid.

6. The apparatus according to claim 1, including a first ball bearing ring located between an end of said expandable hollow body and said axial groove.

7. The apparatus according to claim 6, including a second ball bearing ring placed at the opening of said axial groove for coaction between the expandable hollow body and said axial groove.

8. The apparatus according to claim 1, wherein said axial groove has a conical cross-sectional shape with a widest part facing towards an adjacent part.

9. The apparatus according to claim 8, wherein a cross-sectional shape of said expandable hollow body has a corresponding conical shape.

10. The apparatus according to claim 9, wherein said axial groove and corresponding sections of said expandable hollow body have stepped cross-sectional shapes, with a widest part facing towards an adjacent part.

11. A safety coupling apparatus which comprises:
    a first annular coupling part for attachment to an end of a first rotatable shaft,
    a second annular coupling part for attachment to an end of a second rotatable shaft which is coaxial with the first rotatable shaft,
    said second coupling part defining an axial groove which has an open end facing the first coupling part, said axial groove providing said second coupling part with inner and outer legs, and
    said first coupling part defining an expandable hollow body which axially extends into said axial groove of said second coupling part, said hollow body including a cavity which subdivides said hollow body into inner and outer cylindrical sections which can be (1) filled with pressurized fluid to expand the inner and outer cylindrical sections relative to one another and cause external surfaces thereof to contact adjacent surfaces of said axial groove and thereby prevent relative rotation of the first and second coupling parts, or (2) emptied of pressurized fluid to contract the inner and outer cylindrical sections relative to one another and enable free rotation of the first and second coupling parts relative to the one another, and locking means which engage said inner and outer legs of said second coupling part to prevent divergence thereof.

12. The apparatus according to claim 11, wherein said first coupling part and said second coupling part are mutually adapted to include mutually overlapping and coordinated cylindrical subsections on respective sides of said axial groove.

13. The apparatus according to claim 12, wherein said edges are related peripherally to said first coupling part, and wherein said groove is formed peripherally in said second coupling part.

14. The apparatus according to claim 12, wherein said subsection is adapted for torque transmission via axially orientated and cylindrical outer sections.

15. The apparatus according to claim 14, wherein a length of said outer sections and a normal pressure dependent on the chosen expansion of the expandable hollow body are adapted for a torque transfer of between 10 and 30% of total torque transferred between said first and second coupling parts.

16. The apparatus according to claim 15, wherein the chosen torque transfer is adapted to between 15 and 25%.

17. The apparatus according to claim 15, wherein the axial groove has a length of more than 50% of the length of said expandable hollow body.

18. The apparatus according to claim 17, wherein said length of said axial groove is less than 80% of the axial length of said expandable hollow body.

19. The apparatus according to claim 12, wherein said overlapping subsections have equal radial thicknesses.

20. The apparatus according to claim 11, wherein with regard to the overlapping subsections, the outer subsection has a greater thickness than a thickness of the inner subsection.

21. The apparatus according to claim 11, wherein the first coupling part is formed to function as a locking means against expansion of the free end portions of the legs forming said groove in the second coupling part.

22. The apparatus according to claim 21, wherein the legs forming said groove have equal material thicknesses.

23. The apparatus according to claim 22, wherein a radius difference between the mutually opposing cylindrical outer parts of the groove is smaller or essentially equal to a total radial thickness of said free end portions or legs.

* * * * *